United States Patent [19]

Trishevsky et al.

[11] 4,292,494
[45] Sep. 29, 1981

[54] ELECTRIC SPARK BUILDING-UP OF METAL ON THE WORKING SURFACE OF ROLLS

[76] Inventors: Igor S. Trishevsky, ulitsa 23 Avgusta, 47, kv. 42; Nikolai M. Vorontsov, prospekt Gagarina, 92, kv. 82; Anatoly B. Jurchenko, ulitsa Bairona, 154-a, kv. 114; Vladimir F. Korobeinik, ulitsa Gogolya, 11, kv. 14; Valery N. Zherebtsov, prospekt Traktorostroitelei, 138-a, kv. 25; Igor A. Svistunov, prospekt Moskovsky, 238-a, kv. 49; Sergei I. Rudjuk, ulitsa 23 Avgusta, 47, kv. 63; Vladimir S. Marin, ulitsa Darvina, 16, kv. 74; Viktor N. Bruskov, ulitsa Katsarskaya, 19, kv. 8; Vitaly N. Krupenik, ulitsa Sumskaya, 124-a, kv. 13, all of Kharkov; Alexei A. Sitarchuk, ulitsa Lenina, 176, kv. 81, Zaporozhie; Alexandr D. Bondarenko, ulitsa Transvaalnaya, 15, kv. 1, Kharkov; Vadim M. Schekin, prospekt Dzjuby, 5, kv. 1, Kharkov; Iraida A. Baldakova, ulitsa Fesenkovskaya, 16, kv. 10, Kharkov, all of U.S.S.R.

[21] Appl. No.: 24,974

[22] Filed: Mar. 29, 1979

[51] Int. Cl.³ .................... B23K 28/00; B23K 9/04
[52] U.S. Cl. .................... 219/76.13; 219/76.1
[58] Field of Search ............. 219/76.13, 76.14, 76.1

[56] References Cited

U.S. PATENT DOCUMENTS

| | | | |
|---|---|---|---|
| 3,002,081 | 9/1961 | Wenzel | 219/76.14 |
| 3,277,266 | 10/1966 | Blaszkowski | 219/76.13 |
| 3,277,267 | 10/1966 | Blaszkowski | 219/76.13 |
| 3,339,055 | 8/1967 | Carter | 219/76.14 |
| 3,643,060 | 2/1972 | Carter | 219/76.14 X |

FOREIGN PATENT DOCUMENTS

| | | | |
|---|---|---|---|
| 1204292 | 9/1970 | United Kingdom | 219/76.1 |
| 484964 | 1/1976 | U.S.S.R. | 219/76.13 |

OTHER PUBLICATIONS

Ivanov; G. P. Technolgiya Electroiskrovogo Uprochneniya Instrumentov; Detalei Machin; M. Mashinostroenie; 1957, pp. 176-177.

*Primary Examiner*—Gene Z. Rubinson
*Assistant Examiner*—Keith E. George
*Attorney, Agent, or Firm*—Lackenbach, Lilling & Siegel

[57] ABSTRACT

An electric spark building-up of metal on the working surfaces of rolls is effected by applying a voltage from an unipolar current source to each roll being treated and to an electrode interacting with the surface of the rolls. Building up of metal is effected continuously in the course of operation, the rate of the metal build-up exceeding the rate of wear of the roll surface until a limit layer of metal is formed the thickness of which is maintained constant, thereby maintaining the initial shape of the roll working profile. The device for electric spark treatment is mounted on the rolling stand so that the electrodes and sliding contacts are in contact with the rolls, the electrodes interacting with the working surfaces of the rolls.

6 Claims, 6 Drawing Figures

ELECTRIC SPARK BUILDING-UP OF METAL ON THE WORKING SURFACE OF ROLLS

BACKGROUND OF THE INVENTION

1. Field of the Invention

The present invention relates to electric spark building-up of metal on wearing parts and more particularly to methods of restoring rolls and to devices for carrying out these methods.

Most successfully the invention can be used for hot and cold rolling.

2. Description of the Prior Art

It is known from operating rolling equipment that in the course of rolling, the working surface of rolls is subjected to continuous wear due to friction. Because of irregular wear the roll working surface, i.e. its cross dimensions change, thereby altering specified shape and dimensions of the rolled product. As the wear allowance approaches its permissible limit, it becomes necessary to restore the working surface of rolls to its initial shape in order to avoid an excessive waste of metal being rolled and to prevent spoilage of the finished product.

The simplest method for rebuilding worn rolls consists in removing the surface layers thereof so that their working profile acquire their initial shape. However, as a result of such treatment which is repeated many times during the service life of rolls, the diameter thereof decreases to a size which necessitates their replacement. Moreover, such treatment is a rather labour-consuming one.

In addition, the above method of treatment necessitates dismantling the worn rolls and mounting the restored ones, which makes it necessary to stop the whole production process. This, in turn, results in lower productivity of the rolling mill and entailes the increase of operating costs.

More economical are methods of rebuilding rolls by which a metal layer is built up on the worn surface of rolls, with the thickness of the built-up layer exceeding the depth of wear. Excess metal is then removed from the surface of the built-up layer by machining.

There are known various methods of rebuilding rolls by metal surfacing. However, these methods are mainly applicable for rebuilding rolls having a simple configuration, and are not suitable for restoring rolls made of cast-iron. In addition, the use of such methods necessitates machining the roll surface and hence, their dismantling and mounting.

Known in the art is also the method for strengthening the working surface of rolls by metal surfacing using an electric spark treatment. This method can be used, in particular, for restoring rolls by means of build-up of metal on their working surface.

This method of electric spark treatment of rolls (Ivanov G.P. Technologiya electroiskrovogo uprochneniya instrumentov i detalei machin, M., Mashinostroenie, 1957, p. 177, FIG. 107) consists in that a voltage from a unipolar current source is applied to a workpiece (cathode) to be strengthened and to an electrode (anode) interacting with the working surface of the workpiece.

In the process of electric spark discharge produced in a conventional manner the material of the electrode is transferred onto the roll surface to be strengthened. To provide a high operating durability of the roll being treated by this method it is necessary that the thickness of the built-up layer be as great as possible. However, the thickness of the layer thus formed is limited by the limit layer phenomenon consisting in that there exists a relationship between the thickness of the built-up layer and the welding current, i.e. there exists a maximum thickness of the built-up layer for a given current and voltage. It means that irrespective of the duration of treatment it is impossible to form a layer thicker than the limit layer the thickness of which is determined in each particular case by the current and voltage. According to the experimentally obtained data the maximum thickness of the built-up layer ranges depending on the current applied from 0.005 to 2.0 mm.

Thus, as soon as the voltage from the unipolar current source is applied, the metal begins to build up on the surface being treated as a result of the transfer of the electrode material. After the thickness of the layer assumes a value which is maximum for the current applied ($U = $const, $I = $const), further building-up of metal does not occur in spite of the fact that the electric sparking continues. In this case a further increase of the thickness of the built-up layer can be achieved only by increasing the current and voltage.

However, increasing the thickness of the metal layer by increasing the current and voltage affects the smoothness of the surface being treated, which necessitates machining of the built-up layer to impart the desired smoothness to the working surface of the roll. These disadvantages of the above method of rebuilding rolls are responsible for its limited application. In addition, this method as well as the other known methods require dismantling of rolls for their repair and mounting them again after their being repaired.

An object of the present invention is to provide a method for electric spark building-up of metal on rolls, permitting the initial shape of their working surface to be maintained in the course of operation.

Another object of the present invention is the provision of a device for carrying out the above method permitting the initial shape of the working surface of rolls to be maintained in the course of operation.

Still another object of the present invention is to provide a method for maintaining the initial shape of the working surface of rolls and a device for carrying out this method, which provide for a minimum waste of the metal being rolled.

Further object of the invention is to reduce repair costs of rolls.

SUMMARY OF THE INVENTION

This and other objects of the present invention are accomplished by a method for electric spark building-up of metal on the roll working surface by applying a voltage from a unipolar current source to the roll being treated and to an electrode interacting with the working surface of the roll. According to the invention, building up metal on the working surface of rolls is done during the operation thereof, the current and voltage being so adjusted that the rate of building-up of metal exceeds the rate of wear, and on the working surface of the rollers is formed a limit layer of the metal being built up with a predetermined thickness.

Such method of electric spark building-up of metal provides for maintaining the initial working surface of rolls during a whole period of their operation, thus reducing a waste of metal being rolled, improving the quality of finished product and reducing repair costs.

The wearing rate of the working surface of rolls of a rolling mill may be determined by measuring the wear of the rolls for a certain period, and on the basis of the wearing rate thus obtained the current and voltage can be so adjusted that the rate of building-up of metal layer on the working surface of the rolls exceeds the wearing rate of this layer.

These and other objects of the invention are also attained by a device for carrying out the proposed method directly on the rolling stand which comprises sliding contacts connected to a unipolar current source and being in contact with each roller of the stand, and electrodes mounted in electrode holders for reversible movement at a right angle to the axis of each roll so as to provide their interaction with the working surface thereof and the formation of a metal limit layer thereon for maintaining the initial shape of the roll.

The proposed device enables carrying out the method of maintaining the initial shape of rolls, thereby increasing the service life of rolls, reducing their repair costs and decreasing waste of metal being rolled.

It is advisable that the electrode end face being in contact with the roll working surface be formed congruent therewith, which enables the treatment of narrow grooved rolls used, for example, on wire mills.

It is possible to form the electrode for electric spark treatment of a plurality of individual electrodes so that the end faces thereof would form together a composite surface congruent with the roll working surface. Such construction of the electrode is advisable when the roll to be rebuild has an elongated surface consisting of ordinary portions, for example, such as a cone or a cylinder.

It is useful to mount the electrode holder on guides, thereby permitting its reversible movement along the roll axis, and to provide the holder with a tracing pin which is desirable to be positioned in the same plane with the electrode so as to cause the electrode holder to move along the travelling path conforming to the working profile of the roll. Such embodiment of the invention makes it possible to maintain the initial shape of an elongated complex working surface of rolls used, for example, for manufacturing shaped rolled products.

BRIEF DESCRIPTION OF THE DRAWINGS

The fuller understanding of the nature and objects of the invention will be clear from the preferred embodiments of the method for electric spark building-up of metal on the working surface of rolls, taken in conjunction with the accompanying drawings illustrating the device for carrying out this method, and wherein.

The proposed method of electric spark treatment of the roll working surface is carried out as follows. A voltage from a unipolar current source is applied to the roll being treated and to the electrode interacting with the working surface of the roll.

According to the invention, building-up a limit layer of metal on the working surface of rolls is effected in the course of operation. The thickness of the limit layer of the metal being built-up is kept constant by adjusting the current and voltage so that the rate of building-up of metal exceeds the rate of wear, which, in turn, permits the initial shape and dimensions of the working surface of the roll to be maintained.

The building-up of metal on the initial working surface of the rolls is started simultaneously with the start of rolling operation, the rate of building-up of metal exceeding the rate of wear. As a result, after a certain period, the length of which depends on the difference between the rate of metal building-up and the rate of wear, on the working surface of the roll there is formed a built-up layer the thickness of which is maximum for the current applied. On the portions of the working surface where no wear occurs, the thickness of the built-up layer remains equal to the limit one. On the portions of the working surface where the wear occurs, the thickness of the built-up layer will be less than the limit one, thereby causing the transfer of the electrode material onto the worn portions of the working surface. This transfer continues until the thickness of the built-up layer on the worn portions reaches its maximum value. Thus, the use of the limit layer phenomenon makes it possible to continuously maintain the thickness of the built-up layer constant, i.e., to maintain the initial shape of the roll working surface.

The proposed method for electric spark building-up of metal on the working surface of rolls will be explained further with reference to an embodiment of the device for carrying out the proposed method.

The device for carrying out the method is mounted on the stand 1 (FIG. 1) of a rolling mill comprising at least two rolls 2. The stand 1 includes a pressure mechanism 3 for controlling the gap between the rolls 2.

Figure 1:
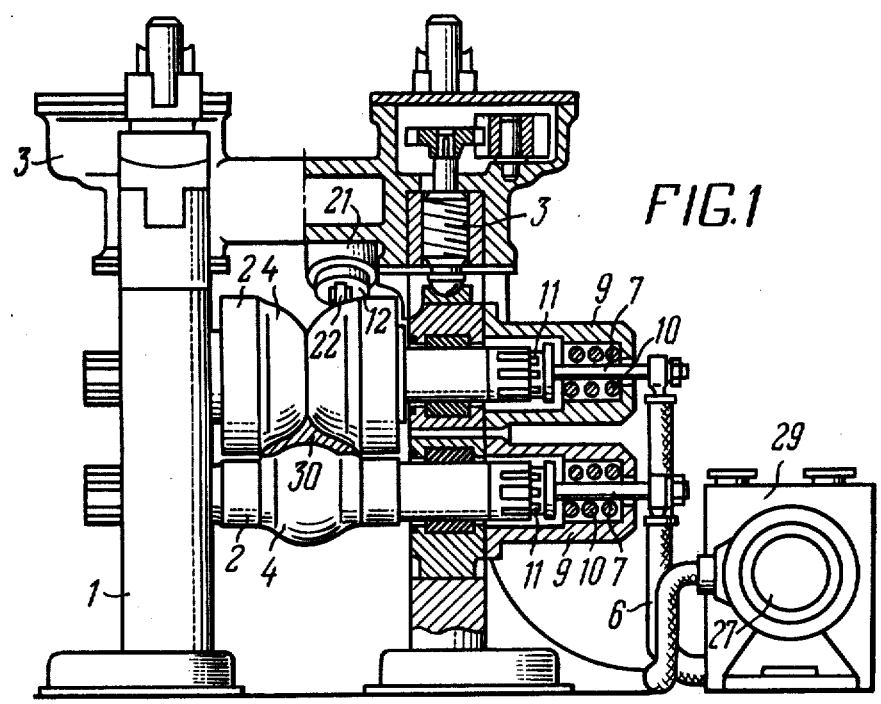
FIG. 1 is a general view of the device for carrying out the method for electric spark building-up of metal on the working surface of rolls, with a part section showing the sliding contacts interacting with the rolls of the rolling stand.
Figure 2:
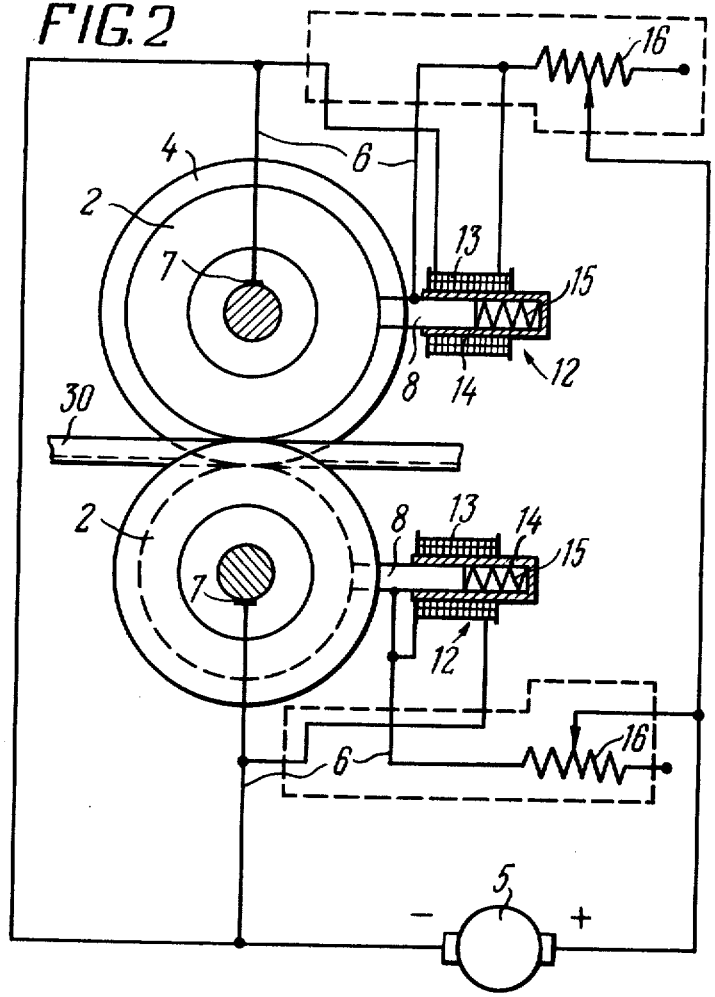
FIG. 2 is a schematical view of the device for electric spark treatment of rolls in the course of operation.

The device for carrying out the method, i.e. for electric spark building-up of metal on the working surface 4 of the rolls 2 (FIG. 2), is provided with a unipolar current source 5 which is electrically connected through conductors 6 to sliding contacts 7 and electrodes 8 (FIGS. 1 and 2).

Fixed to the stand 1 are cylinder sleeves 9 wherein the sliding contacts 7 are mounted. The sliding contacts are mounted so that one end thereof protrudes from the sleeve 9, whereas the other one is pressed against the butt-end surface of the roller 2 by means of a spring 10. On the protruding ends of the sliding contacts 7 are secured terminals of the conductors 6, thereby providing electrical connection of the contacts 7 with the unipolar current source 5 (FIG. 2). On the ends of the sliding contacts 7 which are in contact with the butt-ends of the rolls 2 there are provided slots in which are fixed the graphite brushes 11 (FIG. 1).

To the butt-ends of the rolls are fixed brass washers (not shown) which are in contact with the graphite brushes 11 of the sliding contacts 7.

The electrodes 8 (FIG. 2) are secured in holders 12 for reversible movement with respect to the working surface 4 of the roll 2. The holder 12 is an electric magnet having a solenoid 13 in the air gap of which there is placed a bush 14 for supporting and guiding the electrode 8. Inside the bush 14 is disposed a spring 15 for pressing the electrode 8 against the working surface 4 of the roll 2.

The power circuit comprises a variable resistor 16 intended for adjusting the current.

The solenoid 13 of the electric magnet is connected in the power circuit in parallel with the resistance formed by the gap between the end of the electrode 8 and the working surface 4 of the roll 2.

Figure 3:
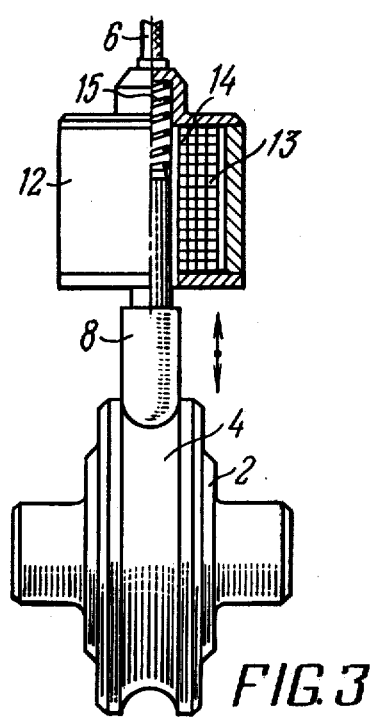
FIG. 3 is a view of a roll having a narrow shaped working surface and of the electrode mounted in the holder, with a part section illustrating the mechanism for reversible movement of the electrode relative to the roll working surface.

According to an alternative embodiment of the invention the end face of the electrode 8 (FIG. 3) interacting with the working surface 4 of the roll 2 has a shape congruent with the working surface 4.

Figure 4:
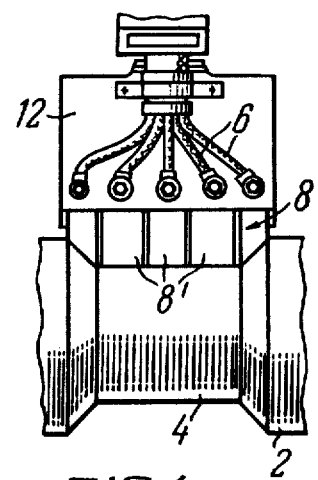
FIG. 4 is a view of the roll and of the composite electrode secured in the holder and interacting with the roll.

According to another embodiment of the invention the electrode 8 (FIG. 4) is composed of the individual electrodes 8'. The end faces of the individual electrodes 8 form together a surface which is congruent with the working surface 4 of the roll 2. The individual electrodes 8 are secured in the common holder 12 and provided each with its own conductor 6.

According to still another embodiment of the invention the holder 12 (FIG. 5) of the electrode 8 has a carriage 17 (FIG. 6) mounted on guides 18 for movement along the axis of the roll 2.

The carriage 17 is connected with a rod 19 of a hydraulic cylinder 20 rigidly mounted on the stand 1.

Figure 6:
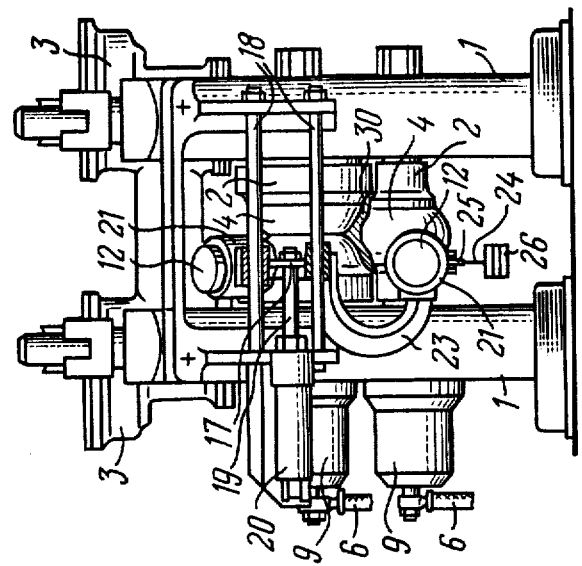
FIG. 6 is a back view in FIG. 1, illustrating the mechanism of reversible movement of the electrode along the axis of the roll.

The holder 12 of the electrode 8 (FIG. 5) is mounted in a sleeve 21 for axial movement. At the butt-end of the electrode holder 12 is mounted a tracing pin 22 which is continuously in contact with the surface 4 of the roll 2. The sleeve 21 is inclined relative to a horizontal. Thus, the upper holder 12 rests with the tracing pin 22 by gravity on the working surface of the roll 2. In order to provide electric spark treatment of the lower roll 2, there is fixed to the carriage 17 (FIG. 6) an arched bracket 23 carrying the sleeve 21 (FIGS. 5, 6) wherein the lower holder 12 is mounted. To the reverse side of the holder 12 there is fastened a rope 24 for pressing the tracing pin 22 against the working surface 4 of the roll 2. The rope 24 is passed on a pulley-block 25 fixed on the sleeve 21, and has at its free end a counter weight 26 (FIGS. 5, 6).

Figure 5:
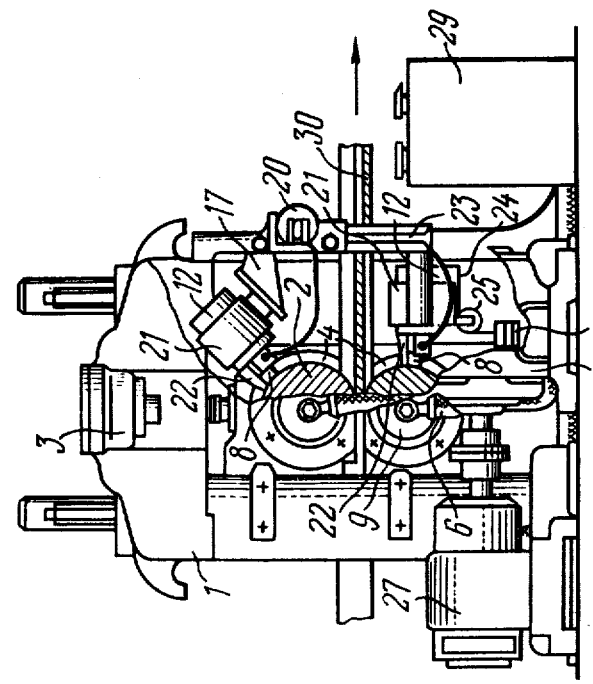
FIG. 5 is a side view in FIG. 1, with a part section showing position of the electrode holders relative to the rolls.

The unipolar current source 27 shown in FIG. 5 is a unipolar current pulse generator having its shaft coupled with the shaft of an electric motor 28. There is also provided a unit 29 for adjusting the current and controlling the hydraulic cylinder 20.

The proposed device for carrying out the method operates as follows.

Under non-operating conditions the rolls 2 (FIG. 2) remain idle, the sliding contacts 7 are pressed by the springs 10 against the butt-ends of the rolls 2 and the electrodes 8 are pressed by the springs 15 against the working surface 4 of the rolls 2.

With the start of the operation the rolls 2 begin to rotate and a metal 30 to be rolled is advanced through the gap between the rolls 2. At the same time the unipolar current pulse generator 27 is activated by the electric motor 28 (FIG. 5).

The current is adjusted with the aid of the resistor 16 (FIG. 2), based on experimentally obtained data, so as to enable the rate of building-up of metal to exceed the rate or wear, with the limit thickness not exceeding a tolerance specified for the roll working surface (for example, several microns).

Since the electrode 8 is pressed against the working surface 4 of the roll 2, electrical resistance at the point of the electrode 8 contact with the surface 4 of the roll 2 is not considerable, which results in a high current in the power circuit. With the solenoid 13 connected in parallel with the electrical resistance at the point of the electrode 8 contact with the roll 2, the current increase in the power circuit results in the increase of the magnetic field of the solenoid 13. The electrode 8 (FIGS. 2, 3), being forced by this magnetic field and overcoming the tension of the spring 15, is drawn into the bush 14. This causes a break of the electrode contact with the surface of the working surface 4 of the roll 2. As a result the current sharply drops, thereby decreasing the magnetic field in the solenoid 13, which in turn results in the spring 15 again pressing the electrode 8 against the surface 4 of the roll 2. Thus, the magnitude of the current passing through the solenoid 13 is determined by the width of the gap between the electrode 8 and the surface being treated. Hence, with the decrease of said gap or in the case of a short circuit, the current in the power circuit and in the solenoid 13 increases. The increase of the current causes the increase of the pulling strength of the magnetic field, thereby moving the electrode 8 into the bush 14 until a gap is formed between the working surface of the roll 2 and the electrode 8.

After the gap between the electrode 8 and the surface 4 of the roll 2 has been formed, there begins electric spark building-up of the electrode 8 material on the working surface 4 of the roll 2.

Under the action of the applied pulse voltage between the electrode 8 and the working surface 4 of the roll 2 there is formed an arc. As a result, the material of the electrode 8 in the arcing zone evaporates and is ionized by an electron flow from the roll 2 surface, thereby causing an ion flow towards the surface 4 of the roll 2. On the surface of the roll 2 the transferred ionized molecules are neutralized, condensed and crystallized. The liquid phase absorbs from the air the nitrogen ionized by the arc. During the crystallization process there occurs a diffusion of the alloying elements into the material of the roll 2 and formation of carbides and carbonitrides.

As a result of the above electric spark treatment on the working surface 4 of the roll 2 there is formed a wear-resistant metal layer.

After a certain period, the duration of which is determined by the difference between the rate of building-up of metal layer and the rate of its wear a metal layer is formed on the working surface of the roll 2, the layer thickness being maximum for a given electric current. It is well known that the wear of the working surface 4 of the roll 2 occurs unevenly. On the portions of the working surface 4, where the wear is negligible, the thickness of the built-up layer does not increase in spite of the sparking. On the portions where the wear occurs the thickness of the built-up layer will become less than a limit one, which causes the transfer of the electrode 8 material onto the worn portions of the working surface 4. Said transfer continues until the thickness of the layer built up at the worn portions of the working surface 4 reaches its limit value. Thus, on the portions where the thickness of the built-up layer as a result of wear becomes less than permissible one, the rate of transfer of the electrode 8 material will be such as to compensate the wear.

Employing the phenomenon of the limit layer thickness permits the thickness of the built-up layer to be kept constant during the whole operating time.

According to one embodiment of the invention, electric spark treatment is performed by reversibly moving the electrode 8 along the axis of the roll 2. In this case the electric spark treatment of the roll 2 is effected as follows. The rod 19, being actuated by the hydraulic cylinder 20, the carriage 17 with the holders 12 starts moving along the axis of the roll 2. As the tracing pins 22 (FIG. 5) of the holders 12 continuously rest upon the surface 4 of the roll 2 they trace the profile of the working surface 4 thus causing the holders 12 to reversibly move in the sleeves relative to the surface of the roll 2. When the carriage 17 reaches its end position, which depends on the length of the working surface 4 of the roll 2, it presses against an end switch (not shown) thereby causing the carriage 17 to move back. The cycle of the carriage movement is repeated and electric spark treatment goes on as described above.

The method will now be explained with reference to embodiments thereof illustrating the process of building-up of metal on the rolls during operation.

EXAMPLE 1

The proposed method and device were used for maintaining the working surface of rolls of the wire mill for rolling 6.5 mm wire. The rolling stand of such mill normally comprises three rolls with the axis of rotation being coplanar. The rolls were disposed relative to each other at an angle of 120°. One of the rolls was subjected to electric spark treatment, the rest ones were not treated in order to determine the extent of their wear as compared to the treated one.

The rollers were made from cast-iron having the following chemical composition (% by weight): C-3.9; Si-0.6; Mn-0.6; P-0.4; S-0.16; Cr- from 0.3 to 0.6; Ni- from 1.5 to 2.5. The chilling depth was from 15 to 30 mm, the hardness being 65-75 Shore units (HS=65-75).

The wire which was rolled had a diameter of 6.5 mm, and was made of steel of the following chemical composition (% by weight): C-0.2; Si-0.2; Mn-0.5; S-0.02; P-0.03; Fe-the balance.

The electric spark treatment was effected with I=3-5 A, V=25 V by the use of the wire electrode 8 (FIG. 3) made of steel containing 0.2% C.

During the test 65 tons of metal were rolled. It was found that the working surface of the rollers which were not subjected to electric spark treatment varied from the initial one by about 1 mm, whereas the working surface of the roll which was subjected to said treatment retained its initial shape.

EXAMPLE 2

The proposed method and device were used for maintaining the working surface of the upper roll of cambering machine. The roll to be treated was made of steel having the following chemical composition (% by weight): C-0.9; Si-0.3; Mn-0.45; S-0.03; P-0.025; Cr-1.6; Fe-the balance. The hardness was 70-75 Shore units (HS = 70-75).

The electric spark treatment was effected with I=8-10 A, V=25 v by the use of an electrode made of steel containing 0.2% C.

Controlled was radius of the working surface of the roll intended for rolling an angle bar 50×50×3, made of steel having the following chemical composition (% by weight): C-0.20; Si-0.20; Mn-0.50; S-0.02; P-0.03; Fe-the balance.

During the test 340 tons of metal were rolled. Generally, after rolling such amount of steel, the radius of the shaping rib of the upper roll being equal to 1.5 mm, increases as a result of wear up to 2.5 mm.

As a result of electric spark building-up of metal on the working surface the radius of the shaping rib retained its initial value.

EXAMPLE 3

The proposed method and device were used for treating the rolls on the 250 mm continuous rolling mill whereon an angle bars 30×40×4 were produced.

To the electric spark treatment were subjected the upper and the lower rolls of the thirteenth rolling stand.

A metal which was rolled had the following chemical composition (% by weight): C-0.20; Si-0.20; Mn-0.50; S-0.02; P-0.03; Fe-the balance.

The rolls which were treated were made of cast-iron having the following chemical composition (% by weight): C-3.90; Si-1.0; Mn-1.0; P-0.35; S-0.16; Cr-from 0.60 to 1.20; Ni-from 1.50 to 2.50; Fe-the balance. A hardness of cast-iron was 60-68 Shore units (HS = 60-68).

The electric spark treatment was carried out with a scanning wire electrode (FIGS. 5, 6) made of steel containing 0.2% C., with I=5-6 A, V=25 v.

During the test 300 tons of a metal were rolled. It was found that the roll working surface retained its initial shape.

The proposed methods for electric spark treatment of rolls and the device for carrying out this method make it possible to maintain the initial working surface of the rolls for the whole operating period, thus decreasing waste of the metal being rolled, improving the quality of the manufactured product and reducing repair costs of rolls.

While particular embodiments of the invention have been shown and described various modifications thereof will be apparent to those skilled in the art and therefore it is not intended that the invention be limited to the disclosed embodiments and the departures may be made therefrom within the spirit and scope of the invention as defined in the claims.

We claim:

1. A method for electric spark build-up of metal on a working surface of rolls in the course of operation of a rolling mill, wherein a voltage from a unipolar current source is applied to each roll being treated and to electrodes each interacting with the working surface of a respective roll, the current and voltage being so adjusted that the rate of build-up of metal exceeds the rate of its wear, thus enabling the formation on the working surface of rolls of a limit layer of metal of predetermined thickness which is a function of the applied current and voltage.

2. A method, as claimed in claim 1, wherein the wearing rate of the rolls is determined by measuring the amount of wear of the rolls for a certain period prior to the build-up process, and, on the basis of the wearing rate, the measured rate of wear being as a reference value, adjusting the current and voltage so as to permit the rate of build-up of a metal layer on the working surface of the rolls to exceed the rate of wear thereof.

3. A device for electronic spark build-up of metal on the working surfaces of rolls in the course of operation of a rolling mill having a stand on which are mounted at least a pair of rolls having a working surface, the device comprising a unipolar current source, sliding contacts, holders, electrodes secured in said holders for transverse movement relative to the axis of said rollers, said sliding contacts and said electrodes being connected to said unipolar current source, said sliding contacts being in contact with each roll, and each of said electrodes interacting with the working surface of each roll during operation of the rolling mill for providing electric spark treatment of the working surface of each roll, thereby maintaining the initial shape thereof.

4. A device, as claimed in claim 3, wherein the end face of each said electrode, interacting with the working surface of the roll, has a shape being congruent with the working surface of the roll.

5. A device, as claimed in claim 3, wherein each of said electrodes is composed of individual electrodes each being connected to said unipolar current source and having an end face being congruent with a respective portion of the working surface of the roll.

6. A device, as claimed in claim 3, wherein said holder is mounted on guides for reversible movement along the axis of the rolls, said holder having a tracing pin positioned in the same plane with the electrode and being in contact with the working surface of the roll so as to cause the holder to move along the travelling path conforming to the profile of the roll.

* * * * *